Feb. 11, 1969
R. F. KALFAS
3,426,905
REPLACEABLE FILTER UNIT FOR COOLANT SYSTEMS
OF INTERNAL COMBUSTION ENGINES
Filed June 20, 1966
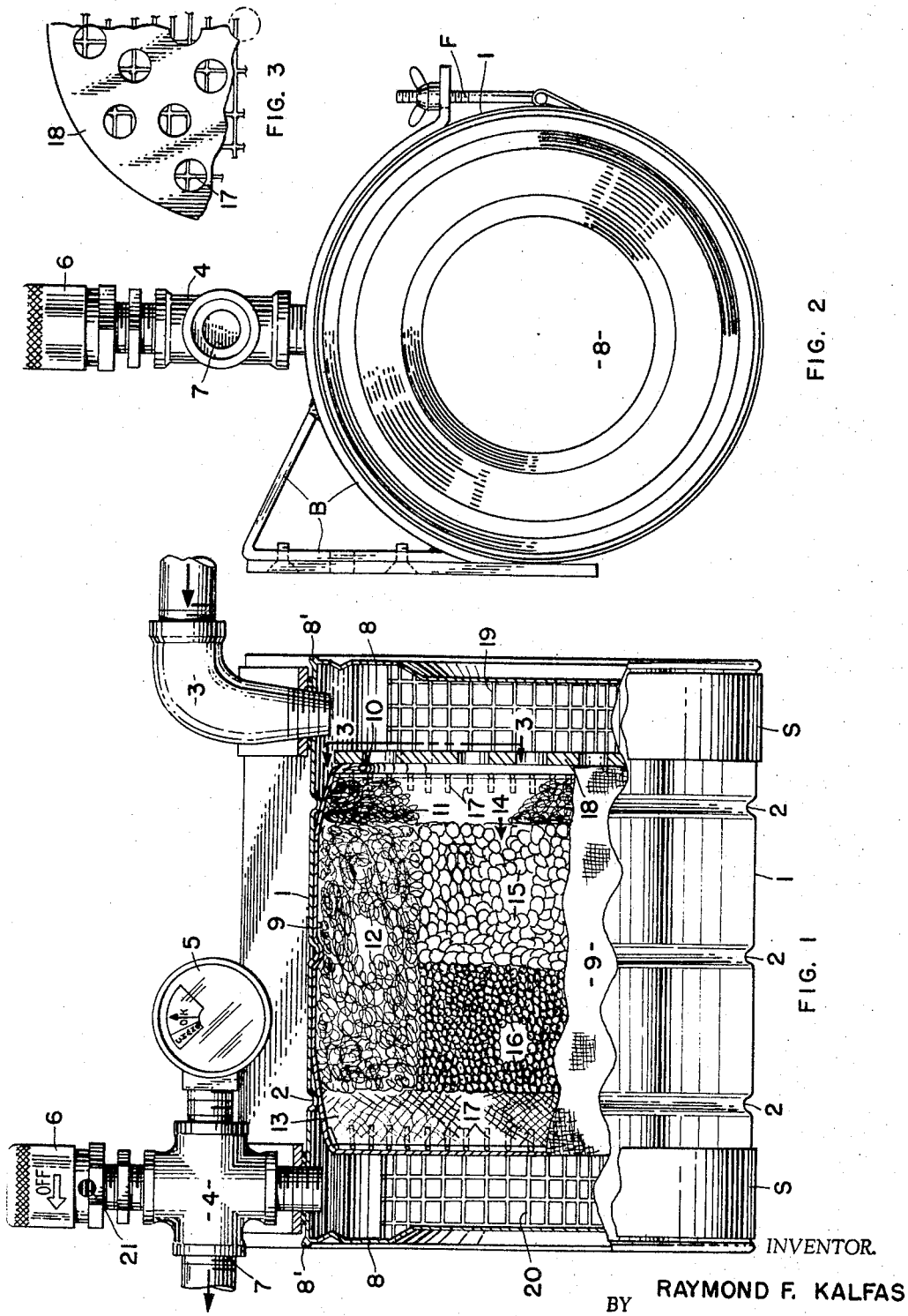
INVENTOR.
RAYMOND F. KALFAS
BY
ATTORNEY

# United States Patent Office 3,426,905
Patented Feb. 11, 1969

3,426,905
REPLACEABLE FILTER UNIT FOR COOLANT SYSTEMS OF INTERNAL COMBUSTION ENGINES
Raymond F. Kalfas, 2380 W. Pleasant Valley Road,
Parma, Ohio 44134
Filed June 20, 1966, Ser. No. 558,729
U.S. Cl. 210—266     3 Claims
Int. Cl. B01d 27/02; C02c 1/18

ABSTRACT OF THE DISCLOSURE

A disposable container for water cooled internal combustion engine cooling systems for effectively and efficiently removing contaminants such as sludge, foreign particles and byproducts of corrosion resulting from chemical or electrolytic reactions, etc. occurring in the service operation of water cooled transport engines, such removal being accomplished by absorption and/or entrapment of such contaminants in a sealed in horizontally disposed canister connected in the coolant system.

---

This invention relates to conditioners for water cooled internal combustion engine cooling systems and more particularly is an improvement in means by which contaminants, such as dirt, sludge, byproducts of corrosion resulting from chemical or electrolytic reactions, heat exchange and other conditions present in the service operation of water cooled transport engines, may readily be removed from the coolant by entrapment or absorption.

I am aware that, heretofore, various types of traps, filters, cleaners and the like have been employed in internal combustion engine cooling systems for the purpose of effecting removal of scale, particulate matter, oil, fuel or grease entrained in the coolant in use. It has been the custom in treating the problem of maintenance of automotive engine cooling systems to employ chemical detergent means to dislodge deposits of oily substances, dirt, grit and corrosion products; to chemically modify the natural coolant, per se, to remove particles or other fouling constituents in the cooling solution; and to chemically modify the pH characteristics of the solution to minimize corrosion tendencies. Furthermore, it has also been the custom of providing mechanical filter means to accommodate large volumes of removal material. Such chemical and mechanical treatments have been applied heretofore as independent means and have failed to satisfactorily reduce the many problems attending engine cooling systems.

It is therefore an object of this invention to provide means which will efficiently and economically condition and maintain the coolant in an engine cooling system in such manner as to accommodate large volumes of removal without blinding, yet to materially remove and reduce the formation of scale, dirt, oxides or other suspended deposits on heat exchange surfaces in the system, under engine operating conditions, thereby to reduce maintenance and operational costs.

Another object is to provide a replaceable filter cartridge capable of removal of large volumes of foulants contained in a cooling system of an internal combustion engine, and in which the direction of flow of coolant through the filter cartridge is substantially in a horizontal direction as distinguished from a substantially vertical direction of flow, thereby to prevent settling of the particulate materials of the coolant in removal such as would cause obstruction or blinding in the filter media.

A further object is to efficiently remove, during engine operation, the coolant entrained particulate matter, such as scale, rust, etc., by deposition within the mass of the filter cartridge as opposed to deposition thereof upon merely a surface of the filter cartridge in the path of coolant flow therethrough.

Still another object is to remove oil, fuel or grease which may become entrained in the coolant, by absorption onto media of a replaceable filter cartridge; and to continuously vent excess air and volatile gases from the filter unit in use.

Another object is to provide electrochemical means by which protection against corrosion or corrosion products may be employed.

Still another object is to provide means at the outlet end of the filter unit by which to determine when the capacity of the replaceable filter element has been expended and when the used element should be replaced by a new element and also to provide means to indicate pressure drop in the outlet side of the filter unit.

Another object is to provide a filter cartridge which is of low cost to produce, which is highly efficient in dislodging, removing and preventing the formation of particulate fluid foulants and other entrainment in the coolant system of an internal combustion engine, and which will be characterized by a longer useful life under all conditions of heat and mileage in use.

Another object is to provide a replaceable filter element of the type set forth herein by which foulants may be removed from the coolant by absorption as well as by entrapment within the interstices of the filter element components.

Other objects and advantages of the invention will become apparent as the following description and disclosure thereof progresses, reference being made to the accompanying drawings in which like reference characters designate like parts throughout the same.

In the drawings:

FIGURE 1 is a side elevation of a form of my invention, shown partly broken away and in section, to more clearly illustrate the filter element and its component parts;

FIGURE 2 is an end view of the device shown in FIGURE 1 looking toward the left hand end of FIGURE 1; and FIGURE 3 is an enlarged fragmentary view taken in the direction of line 3—3 of FIGURE 1.

In carrying out this invention, particularly in the form illustrated in the drawings, the invention includes the provision of a filter support, such as a bracket B which may be secured to a convenient portion of the cylinder block of an internal combustion engine or to the vehicle frame at a location convenient to the coolant system for connection thereto.

A replaceable filter unit, indicated generally at 1, is securely mounted on the bracket by means of a pair of straps or bands S, the respective ends of which may be connected so a fastener means F for drawing the straps tightly around the outer shell of the filter canister 1. There are preferably a plurality of spaced apart circumferential ribs 2 formed in the canister and projecting radially inwardly thereof for engaging and gripping the filter cartridge housed within the canister.

The canister is provided with fitting 3 at the inlet to the canister, and this is preferably located at or near the top of the canister and, of course, is connected by a conduit (not shown) in the coolant system. An outlet fitting 4 is provided and communicates the canister with the coolant system to return the filtered coolant back to the system through the conduit 7. The fitting 4 is also located at or near the top of the canister and has connection with a pressure gauge 5 by which the condition of the filter cartridge may be determined in order to indicate when replacement is necessary. Also carried by the fitting 4 is a vent device 6 to effectively vent off excess air and/or volatile gases from the unit even under vibration during vehicular operation.

As will be seen from the drawing, the canister 1 is of cylindrical form and is closed and sealed at its ends by the walls 8.

In the course of assembly, the filter cartridge is inserted into the canister and positioned substantially midway of the ends 8 and between the inlet and outlet fittings 3 and 4.

This cartridge consists essentially of an outer envelope 9, preferably formed of a fabric such as terry cloth, and is in the form of a bag closed at the outlet end and having a drawstring or the like 10 threaded along the edge portion defining the open inlet end of the cartridge.

The cartridge, according to this invention, includes a multiplicity of sections of selected materials as indicated at 11, 12, 13, 15 and 16, arranged in end-to-end relation and in a selected sequence in a direction from inlet to outlet, to accomplish a controlled order of separation of foulants from the coolant passing therethrough. The materials 15 and 16 are disposed in end-to-end relation within a cavity or bore 14 formed axially within the material 12.

A wire cloth grid 17 is disposed in each end of the bag 9, the grid 17 in the closed end of the bag serving to reinforce the bag end and to maintain it in substantially smooth flat form while the ends of the wires forming the grid are turned inwardly, as shown, to engage the mass of material 13 and to help reinforce the adjacent periphery of the bag against collapse. The other grid 17 is disposed within the open end of the bag or envelope 9 with the wire ends opposing the wire ends of the first grid and in engagement with the material 11.

The filter materials housed within the envelope 9 which I have found to give excellent results in removing foulants such as oxides, scale, oil, etc., from the coolant passing in relatively high volume through the filter cartridge consist of the following, reading from the inlet to the outlet, medium grade steel wool, fine grade steel wool 12, fiber glass 13, charcoal particles 15 and activated charcoal particles 16.

These materials as arranged in FIGURE 1 are firmly held together between the grids 17 when the drawstring 10 is tightened to pull the open end circumferential portion of the envelope radially inwardly over the outer edge of the grid 17. The ribs 2 of the canister engage the envelope under sufficient pressure to seal against any leakage or flow reversal between the envelope and the canister cylindrical wall.

The grids 17 are preferably constructed of galvanized zinc coated wire.

Also within the canister and forming a part of the filter unit is a perforated plate 18 of sacrificial magnesium or magnesium alloy. This plate is interposed between the open end of the envelope and an annular wire cloth spacer member 19 which annularly abuts the end wall 8 at the canister inlet end, and also abuts the plate 18. It is to be noted that the ends of the envelope are spaced sufficiently from the respective walls 8 to provide voids for receiving the spacers 19 and 20, respectively, the spacer 20 being a duplicate of 19 in form and abuts the closed end of the envelope and the adjacent end wall 8 of the canister.

The spacers are of smaller diameter than the end portions of the canister and thus provide annular chambers therebetween in direct communication with the inlet and outlet passages, respectively.

Referring more particularly to FIGURE 1, it will be seen that in accordance with this invention the canister 1 is connected in the coolant circuit and is disposed in a horizontal position. In this position, the inlet 3 admits latent coolant into the circumferential space between the spacer 19 and the outer wall of the canister, while the outlet end of the canister likewise having a horizontal space at its end surrounding the spacer 20 communicates through a fitting 4 to return the unladen coolant to the coolant circuit.

It will be noted that the canister 1 and the cartridge unit are disposed in a horizontal position and that not only the open mesh spacers in the respective ends of the cartridge, but also the sacrificial plate 18 and the grid 17, as well as the cartridge components 11, 12, 13, 15 and 16 are arranged in end-to-end relation in substantially that order, the element 12 having a bore 14 within which the carbon and activated carbon granules 15 and 16, respectively, are housed.

By virtue of this simplified organization within the cartridge, it will readily be seen that latent coolant which enters the circumferential void around the spacer screen 19 will have relatively free movement through the sacrificial plate and the right hand grid 17 at the open end of the cartridge envelope and as the latent fluid passes progressively through these sections of elements from right to left, the entrainment will be progressively trapped and filtered out of the coolant in a highly efficient manner and that the cleansed coolant will pass into the circumferential space around the spacer 20 and into the outlet substantially free of particulate matter.

As the latent fluid passes in a downward direction into the circumferential void around and through the spacer 19, it assumes initially a direction of flow which causes centrifugal separation of some of the heavier solid particles contained in the entrainment, these passing into and toward the base of the canister within the circumferential void and that the direction of fluid flow is then changed to substantially horizontal direction passing into and through the sacrificial metal element 18, after which the fluid passes through the adjacent zinc coated wire cloth grid 17 which forms a relatively free passage area into the interior of the filter unit housed within the envelope 9. The effect of the sacrificial plate is to provide a galvanic condition tending to remove certain entrainment by electrolytic action.

As the coolant fluid which is still laden with some entrainment passes through the cartridge horizontally, the metal fiber media of the elements 11 and 12, which of course possess a great multiplicity of interstices of selected dimensions or size, entrap certain particle forms not previously removed from the coolant fluid and allow certain lesser forms not previously removed from the fluid to pass through these elements.

A portion of fluid passes from the grid 17 through the enclosed media 15 and 16 consisting of coarse granular charcoal and a medium fine granular activated carbon 16, thus removing from the coolant fluid flowing therethrough certain impurities and other entrainment without severely curtailing fluid flow.

The end element 13, which preferably consists of fiber glass, receives the coolant passing through the elements 11, 12, 15 and 16 and provides a further and prefinal filtering media which is extremely effective in removing from the fluid entrainment tailings which heretofore had possibly not been removed up to this stage. As a final filtering media, the terry cloth envelope 9 at its closed end portion will serve to remove tailing fines and residual traces of oil, grease, fuel, etc.

The cleansed coolant then passes into the fitting 4 and out to be returned to the line.

It is to be noted that because of the novel arrangement of the filter media and the disposition of the canister and the cartridge containing the media, together with the location of the inlet and outlet connections at the top of the canister, a substantially horizontal flow is insured. Under such conditions, any tendency to blind the filter, that is, by an accumulation of removed particles, sludge or the like, in the direct path of flow within the filter is substantially eliminated since these particles to a great extent will build up along the bottom portion of the filter element, thus insuring a longer period of useful life of the filter element before it is necessary to replace the same, as distinguished from those types of filters which have heretofore been in common use in which the coolant flow is restricted to a substantially vertical direction, that is, in the form of either an upflow or a downflow. This has been one of the chief disadvantages of the vertical flow types of filters since they are subject to blinding more quickly and thus have a shorter useful life and must be removed when blocked or blinded with entrainment.

It is also to be noted that communicating with the outlet fixture 4 is a pressure gauge 5 which will indicate the pressure drop between the inlet and outlet in terms which will show the necessity for removing the canister and replacing it with a clean one.

The filter may be automatically vented at its discharge end through the vent 6 to the outside atmosphere through the opening 21 to relieve the interior of the canister of excess air and volatile gases in the system. The vent 6 preferably is of a commercial type employing hydroscopic discs controlling a needle point valve member. This type is especially suited for use in connection with my invention because it is not affected by vibration or jolting during vehicular activity.

The foregoing description and accompanying drawing are considered as illustrative only of the principles of the invention and the filter unit of the present invention is not to be regarded as limited by the above described embodiments. Alternative arrangements of parts, substitution of materials and other organization and assembly procedures, apparent to those skilled in the art, may be employed without departing from the scope and spirit of the invention as claimed.

I claim:
1. A replaceable filter construction for use in removing entrainment from coolant systems of internal combustion engines, which includes a sealed canister having a longitudinal axis and an inlet passage and an outlet passage, said canister, when connected at its inlet and outlet passage in a coolant system, being disposed with its longitudinal axis in a substantially horizontal direction, an envelope of fibrous cloth material having a closed outlet end wall and open at its inlet end, and a plurality of graded filter media arranged in a plurality of layers lying transverse to the longitudinal axis of the canister, said envelope being spaced at each of its ends from the ends of the canister, an annular open mesh spacer element between the respective adjacent ends of the canister and the envelope, said filter media layers in the direction of flow including metallic wool elements of coarse and finer grades, respectively, and a perforated plate of sacrificial metal interposed between the open end of the envelope and the adjacent spacer in the inlet end of the canister.

2. The invention according to claim 1 in which one of said filter media layers is in the form of an annulus having a central bore, and at least one carbonaceous filter layer housed within the bore.

3. The invention according to claim 2 and including a supporting end grid member disposed in said envelope to lie transverse to the canister axis in each end thereof, one of said grid members being disposed in the open end of the envelope adjacent the inner face of said plate, and means for drawing the open end portion of the envelope over and radially of the circumferential edge of the grid therein.

References Cited
UNITED STATES PATENTS

| | | | |
|---|---|---|---|
| 917,933 | 4/1909 | Dittbenner | 210—282 X |
| 2,082,871 | 6/1937 | Callery et al. | 210—90 |
| 2,270,969 | 1/1942 | Robinson | 210—317 |
| 2,328,131 | 8/1943 | Eisler | 210—90 |
| 2,371,444 | 3/1945 | Hubert | 210—282 |
| 2,697,522 | 12/1954 | Lawrence | 210—484 X |
| 3,254,771 | 6/1966 | Sicard | 210—282 X |

REUBEN FRIEDMAN, *Primary Examiner.*

JOHN ADEE, *Assistant Examiner.*

U.S. Cl. X.R.

210—282, 289, 484